Dec. 14, 1926.
W. N. SPIRES
1,610,627
METHOD AND MACHINE FOR MAKING WALL BOARD
Filed Feb. 17, 1923
3 Sheets-Sheet 1
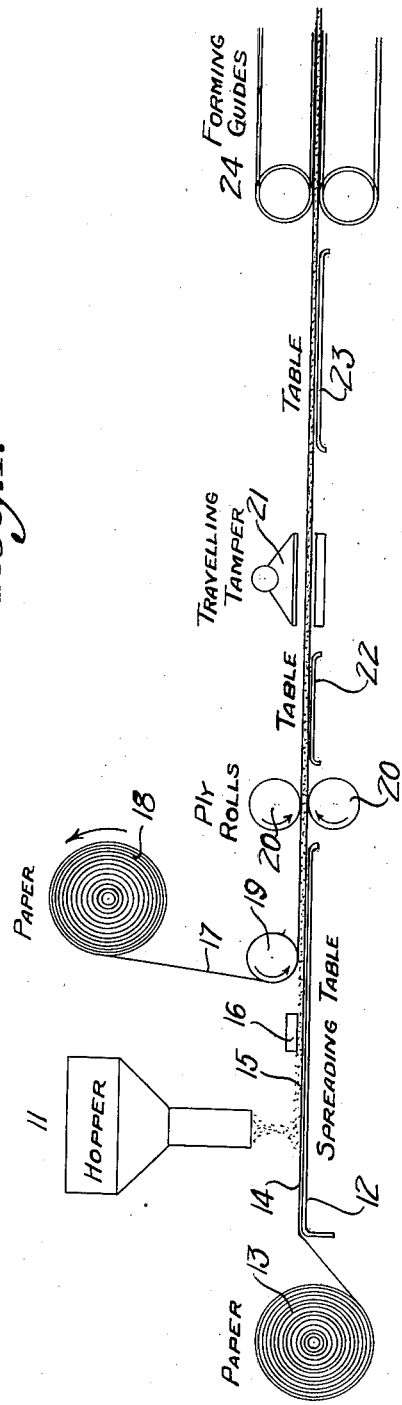
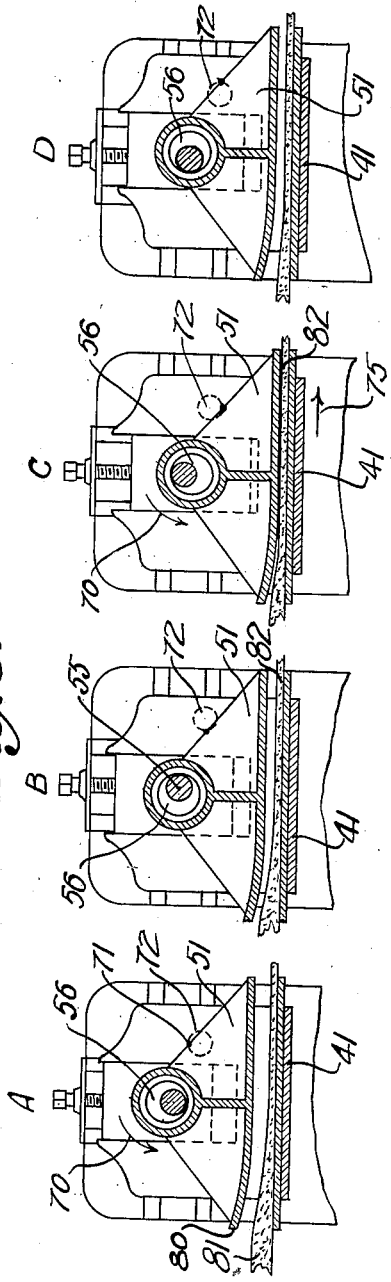
INVENTOR:
WESLEY N. SPIRES,
BY
Graham + Lumi
ATT'S.

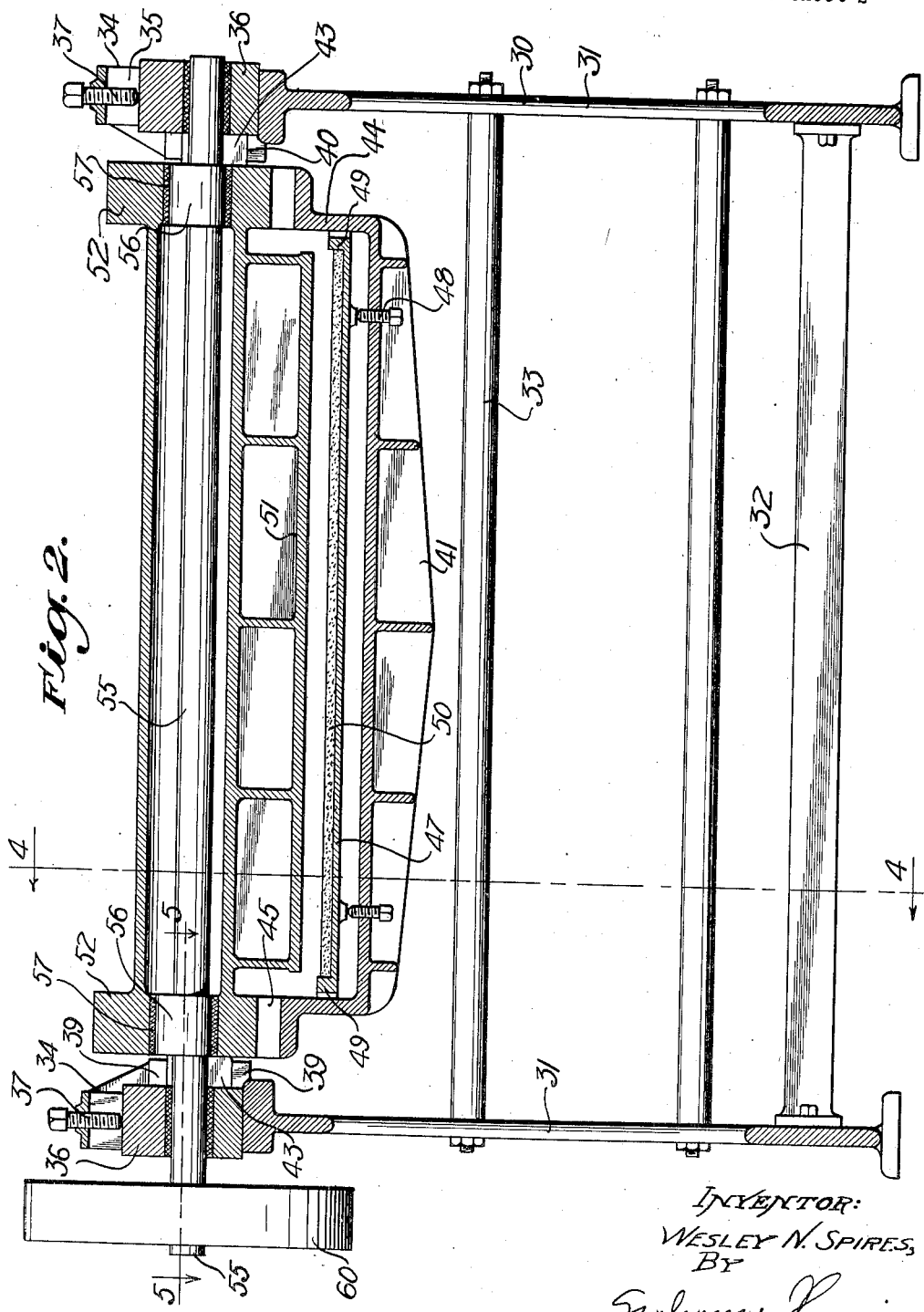

Dec. 14, 1926. 1,610,627
W. N. SPIRES
METHOD AND MACHINE FOR MAKING WALL BOARD
Filed Feb. 17, 1923   3 Sheets-Sheet 3
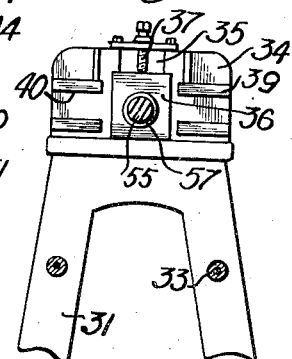
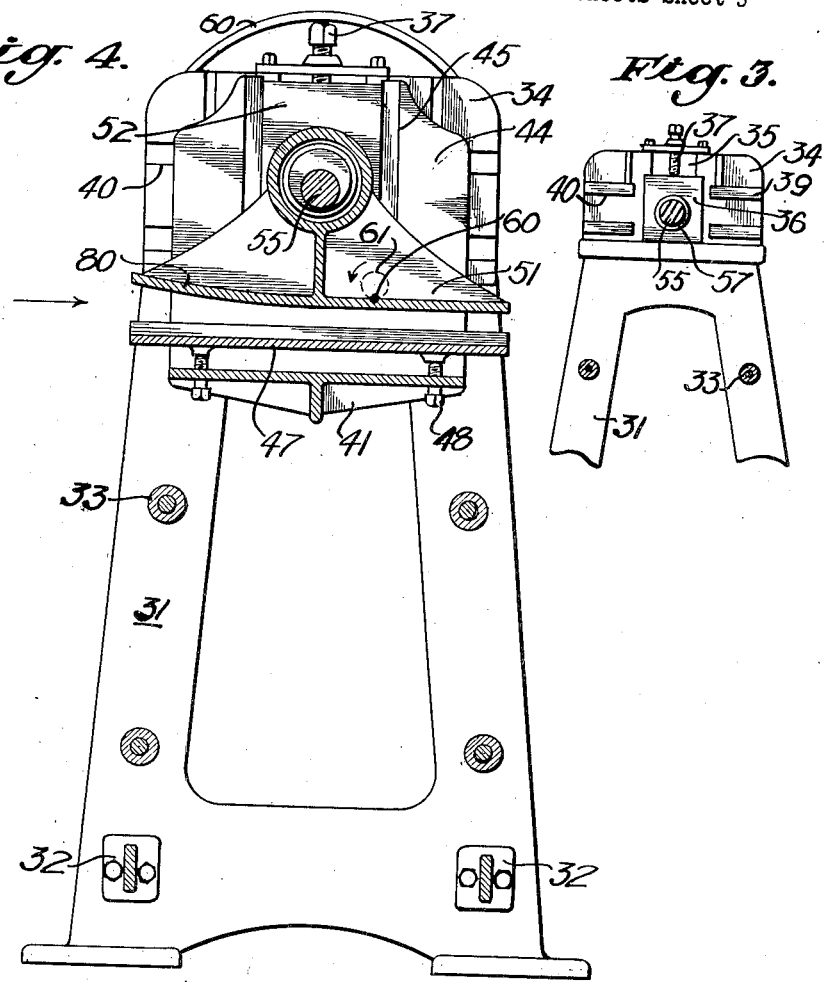
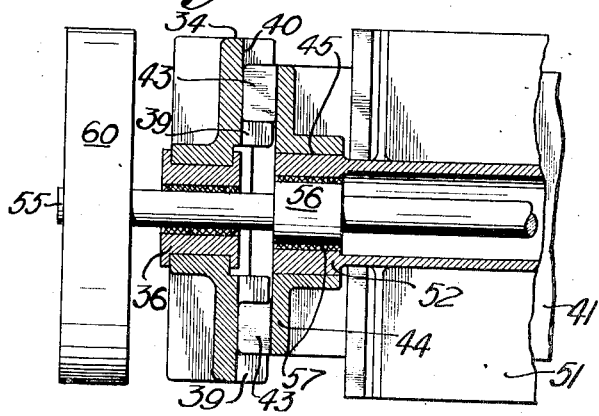
INVENTOR:
WESLEY N. SPIRES,
BY
Graham + Harris
ATT'S.

Patented Dec. 14, 1926.

1,610,627

UNITED STATES PATENT OFFICE.

WESLEY N. SPIRES, OF LOS ANGELES, CALIFORNIA.

METHOD AND MACHINE FOR MAKING WALL BOARD.

Application filed February 17, 1923. Serial No. 619,670.

This invention relates to the manufacture of wall board. This term wall board designates an article of manufacture commonly employed in building construction which is made by enclosing between separate sheets of paper, a material having sound and heat insulating qualities, such as a plaster mixture, which is spread between the sheets in plastic form and therebetween allowed to harden. The filler employed in wall board is generally made from gypsum and sawdust.

In the present manufacture of wall board, the proportions of gypsum used in combination with saw-dust govern the strength of the product, and it is found that in order to maintain a reasonable strength, from 80% to 90% of the gypsum must be employed. The lack of strength when smaller proportions of gypsum are used is evidently due to voids resulting between the particles of sawdust in the plastic mixture, resulting from the insufficient bonding qualities of the gypsum employed.

My invention provides a process and machine for making wall board, which will have ample strength and favorable heat insulating qualities, from plastic mixtures of a cementitious substance, such as gypsum, and fibrous materials, such as saw-dust, cork-dust and other by-products. By this process is enabled the use of increased quantities of the fibrous substance and reduction in proportions of cementitious material, it being possible to make a very satisfactory and durable wall board from plastic mixture containing equal parts of the above named materials.

It is an object of the invention to form a wall board by spreading a plastic mixture, containing fairly large proportions of fibrous material, between enclosing sheets and to thereafter compact the plastic material together, before setting or hardening, by the tamping application of flat plate members upon the exterior of the enclosing sheets.

It is a further object of the invention to provide a tamping device for use in the manufacture of wall board, and similar articles, which travels forwardly with the wall board when it is in contact therewith.

The specific advantages of my invention and further objects thereof will be made evident hereinafter, Referring to the drawing which is for illustrative purposes only, Fig. 1 is a diagrammatic view illustrating the consecutive operations which may be desirably employed with my invention.

Fig. 2 is a vertical section through the tamping machine which I have devised.

Fig. 3 is a fragmentary view showing the horizontal slides which are formed in the supporting heads of the frame members.

Fig. 4 is a section taken upon a plane represented by the line 4—4 of Fig. 2.

Fig. 5 is a fragmentary section taken upon a plane represented by the line 5—5 of Fig. 2.

Fig. 6 is a somewhat diagrammatic view indicating the movement of the tamping members, and illustrating the action thereof upon the wall board as it is carried through the tamper.

In the practice of my invention, the apparatus indicated in Fig. 1 may be employed. A hopper 11 is disposed above a spreading table 12 over which a sheet 14 of paper, cloth, or other desirable material is carried from a roll 13. As the sheet of paper 14 travels over the table, plastic material 15 is spread over the surface thereof by a spreader 16 and an upper sheet of paper 17 is disposed upon the layer of plastic material, this paper being taken from a roll 18 and conveyed over a roller 19, from whence the sheets 14 and 17 having a plastic material disposed therebetween are carried through ply rolls 20, and then through a travelling tamper 21 which is located between tables 22 and 23. From the table 23, the tamped board is carried between forming guides 24 and from thence onto a conveyor of considerable length, whereupon the filler of the wall board, which filler is composed of the plastic material, hardens or sets.

My invention contemplates a means as hereinbefore described for compacting the filler of the wall board so that an intimate contact between the fibrous particles which are coated and intermixed with the cementitious substance is attained, thereby eliminating voids and increasing the bond to an extent giving a desired increase in strength. A type of machine which may be satisfactorily employed for compacting the filler consists of what I term a travelling tamper. This travelling tamper, as shown in Fig. 2, is provided with a frame 30 composed of end members 31 which are suitably joined together in spaced relationship by interconnecting members 32 and 33. At the upper end of each end member 31 a head 34 is formed, this head being provided with a vertical groove 35 in which a journal 36 is held by suitable means such as illustrated by the set screws 37. On the inner face of each head projecting webs 39 are disposed, forming therebetween a horizontal slide 40. Between the heads 34 a reciprocating tamping base 41 is supported, this tamping base 41 having projections 43 formed on the ends thereof which extend into and slide in the slides 40 formed between the webs 39 of the heads 34; and in each upwardly projecting end 44 of the tamping base a vertical slide 45 is formed as indicated in Figs. 4 and 5. An adjustable tamping table 47 is mounted upon adjusting means 48 in the tamping base 41 and has upwardly extending side flanges 49 between which the wall board designated as 50 is guided. An oscillating tamping plate 51 is disposed above the adjustable table 47 and has blocks 52 formed upon each end thereof which operate in the vertical slides 45 of the reciprocating tamping base. A shaft 55 extends through the journals 36 and has eccentric cylinders 56 formed thereupon which rest in bearings 57 formed in the blocks 52 of the tamping plate 51. The shaft 55 may be rotated by means of belt engagement with a pulley 60 or otherwise.

The tamping plate 51 is vertically slidable in the vertical slides 45 of the tamping base 41 which in turn is horizontally movable in the slides 40 provided by the heads 34. Therefore, it will be perceived that the tamping plate 51 may be moved in any direction, but is maintained at all times in vertical position; while the tamping base 41 may move only horizontally. Therefore, as the shaft is rotated, causing the cylindrical eccentrics 56 to rotate about the center of the shaft, the tamping plate 51 will move through a circular cycle, being as before stated maintained at all times in a vertical position. Therefore, any point such as indicated at 60 in the plate will travel through the cycle indicated in Fig. 4 by the dotted circle 61. Owing to the engagement of the blocks 52 with the slides 45 of the tamping base 41, the tamping base is caused to travel horizontally in a reciprocating manner as the tamping plate 51 oscillates.

Fig. 6 illustrates the sequence of relative movements between the tamping plate 51 and the tamping base 41. At A the tamping plate 51 is shown in raised position owing to the fact that the eccentrics 56 are pointed upwardly. Let it be considered that the shaft is rotating in the direction indicated by the arrow 70. As the shaft rotates through a quadrant in this direction, the eccentric 56 will be brought into the position indicated in view B of Fig. 6, and any point 71 in the tamping plate 51 will be carried from the position at the top of a cycle 72 as indicated in A, to the position at the left side of the cycle 72 as indicated in B, thereupon causing movement of the tamping base 41 to the left to correspond to the left hand oscillatory movement of the tamping plate 51. Further revolution of the shaft 55 brings the two eccentrics 56 into the downwardly disposed position, causing the tamping plate 51 to move downwardly and forwardly through a quadrant of its circular cycle of movement and into closer relationship with the tamping base 41. During this downward and forward movement, the tamping plate 51 makes contact with the wall board 50 and during such contact the tamping plate 51 and the tamping base 41 are moving forwardly or in a right hand direction with the wall board, as indicated by the arrow 75. Thenceforth with the continued rotation of the shaft 50, the plate member 51 travels upwardly and forwardly away from contact with the wall board 50, and from thence the cycle of oscillation and the synchronous reciprocation of the tamping plate 41 is duplicated.

It will be noted that the forward end 80 of the tamping plate 51 is sloped upwardly to provide for an increased width of mouth of the tamping members into which the non-compacted portion 81 of the wall board, as indicated in Fig. 6, may enter. In making wall board having a finished thickness of three-eighths of an inch, the plastic mixture or filler 15 is spread between the sheets 14 and 17 to a thickness of substantially three-fourths of an inch. As the wall board in its wet state passes through the tamper, this thickness, as indicated at 81, is reduced, by the compacting action of the tamper, to the desired finished thickness indicated at 82 in Fig. 6. The shaft 55 is adapted to operate at a high rate of speed, preferably around 2000 R. P. M. so that the tamping action upon the wet wall board is very rapid, and owing to the travelling feature of the tamper 41, does not interfere with the speed of production of the wall board. In other words, the sheets 14 and 17 travel along at the customary speed employed in wall board manufacture and are unhampered by the action of the tamper owing to the travelling feature thereof when in compacting contact with the unfinished board.

I claim as my invention:

1. The herein described method of making wall board which includes: placing a mixture in outspread disposal between sheets; and compacting said mixture together between externally applied plates operating to subject the material to a multiplicity of tamping impacts.

2. The herein described method of making wall board which includes: placing a plastic mixture in outspread disposal between sheets; and compacting said plastic mixture between externally applied plates operating to subject the material to a multiplicity of tamping impacts.

3. The herein described method of making wall board which includes: placing a plastic mixture in outspread disposal between sheets; and compacting said mixture together while still in plastic condition between externally applied plates operating to subject the material to a multiplicity of tamping impacts.

4. The herein described method of making wall board which includes: placing the mixture in outspread disposal between sheets; and compacting said mixture by subjecting the material to a multiplicity of rapid tamping impacts.

5. The herein described method of making wall board which includes: placing a plastic mixture in outspread disposal between sheets; and compacting said plastic mixture by subjecting the material to a multiplicity of rapid tamping impacts.

6. The herein described method of making wall board which includes: placing a plastic mixture in outspread disposal between sheets; and compacting said mixture while still in plastic condition by subjecting the material to a multiplicity of rapid tamping impacts.

7. The herein described method of making wall board, which includes: placing a mixture in outspread disposal between sheets; and tamping said mixture together.

8. The herein described method of making wall board, which includes: placing a mixture in outspread disposal between sheets; and tamping said mixture together while it is still in plastic condition.

9. The herein described method of making wall board, which includes: placing in outspread disposal between sheets, a plastic mixture and compacting said mixture together between externally applied plates which subjects said mixture to a tamping action and travel forwardly with said sheets when in contact therewith.

10. In apparatus for making wall board, the combination of: means for spreading a mixture between flexible sheets; and means for tamping said mixture so that it will be pressed together in compact form.

11. In apparatus for making wall board, the combination of: means for spreading a mixture between flexible sheets; and travelling means for tamping said mixture so that it will be pressed together in compact form.

12. In combination with apparatus for making wall board: a tamper for compacting the filler of said wall board.

13. In combination with apparatus for making wall board: a travelling tamper for compacting the filler of said wall board.

14. In combination with apparatus for making wall board: a tamper for compacting the filler of said wall board, said tamper comprising a pair of plates, one above and one below said wall board, adapted to move relatively together so as to compress said wall board.

15. In a tamping machine, the combination of: a horizontally movable member; an oscillating member; and means operative between said members moving said movable member in alignment with said oscillating member.

16. In a tamping machine, the combination of: an oscillating member; and a reciprocating member, said reciprocating member reciprocating in alignment with said oscillating member.

17. In a travelling tamper, the combination of: a horizontally reciprocating bed; an oscillating tamping plate above said bed; and means for actuating said bed and said tamping plate.

In testimony whereof, I have hereunto set my hand at Los Angeles, California, this 8th day of February 1923.

WESLEY N. SPIRES.